United States Patent
Suganuma et al.

(10) Patent No.: US 11,273,525 B2
(45) Date of Patent: Mar. 15, 2022

(54) BONDING MATERIAL, METHOD FOR PRODUCING BONDING MATERIAL, AND METHOD FOR PRODUCING BONDING STRUCTURE

(71) Applicants: OSAKA UNIVERSITY, Osaka (JP); National Cheng Kung University, Tainan (TW)

(72) Inventors: Katsuaki Suganuma, Suita (JP); Shijo Nagao, Suita (JP); Shih-Kang Lin, Tainan (TW)

(73) Assignees: OSAKA UNIVERSITY, Osaka (JP); National Cheng Kung University, Tainan (TW)

( * ) Notice: Subject to any disclaimer, the term of this patent is extended or adjusted under 35 U.S.C. 154(b) by 628 days.

(21) Appl. No.: 16/077,376

(22) PCT Filed: Feb. 10, 2017

(86) PCT No.: PCT/JP2017/004943
§ 371 (c)(1),
(2) Date: Aug. 10, 2018

(87) PCT Pub. No.: WO2017/138639
PCT Pub. Date: Aug. 17, 2017

(65) Prior Publication Data
US 2019/0047093 A1 Feb. 14, 2019

(30) Foreign Application Priority Data
Feb. 12, 2016 (JP) .............................. JP2016-024512

(51) Int. Cl.
*B23K 35/00* (2006.01)
*B23K 1/00* (2006.01)
(Continued)

(52) U.S. Cl.
CPC ........ *B23K 35/3006* (2013.01); *B23K 1/0016* (2013.01); *B23K 20/00* (2013.01); *B23K 35/0238* (2013.01); *B23K 35/30* (2013.01); *B23K 35/40* (2013.01); *C23C 30/00* (2013.01); *B23K 2101/40* (2018.08)

(58) Field of Classification Search
CPC ........... H01L 2224/29339; H01L 24/83; H01L 2224/05573
See application file for complete search history.

(56) References Cited

U.S. PATENT DOCUMENTS 5,288,351 A 2/1994 Hoang et al.
5,916,520 A 6/1999 Maruyama et al.
(Continued)

FOREIGN PATENT DOCUMENTS

CN 103237863 A 8/2013
CN 103283078 A 9/2013
(Continued)

OTHER PUBLICATIONS

JP2010/046696 computer english translation (Year: 2010).*
(Continued)

*Primary Examiner* — Erin B Saad
(74) *Attorney, Agent, or Firm* — Studebaker & Brackett PC

(57) ABSTRACT

A bonding material (10) of the present invention includes an amorphous silver film (12).

14 Claims, 15 Drawing Sheets

(51) Int. Cl.
   *B23K 3/00* (2006.01)
   *B23K 35/30* (2006.01)
   *B23K 35/40* (2006.01)
   *B23K 20/00* (2006.01)
   *B23K 35/02* (2006.01)
   *C23C 30/00* (2006.01)
   *B23K 101/40* (2006.01)

(56) References Cited

U.S. PATENT DOCUMENTS

| | | | |
|---|---|---|---|
| 9,083,057 | B2 | 7/2015 | Koshida et al. |
| 10,332,853 | B2 | 6/2019 | Suganuma et al. |
| 2013/0273438 | A1 | 10/2013 | Koshida et al. |
| 2015/0292076 | A1 | 10/2015 | Asada et al. |
| 2016/0035691 | A1 | 2/2016 | Yamazaki et al. |
| 2016/0121432 | A1 | 5/2016 | Watanabe et al. |
| 2017/0077057 | A1 | 3/2017 | Endoh et al. |
| 2017/0170137 | A1* | 6/2017 | Suganuma .............. H01L 24/81 |

FOREIGN PATENT DOCUMENTS

| | | |
|---|---|---|
| JP | S64-048696 A | 2/1989 |
| JP | H09-249463 A | 9/1997 |
| JP | H09-323168 A | 12/1997 |
| JP | 2008-010703 A | 1/2008 |
| JP | 2010-046696 A | 3/2010 |
| JP | 2012-210639 A | 11/2012 |
| JP | 5207281 B2 | 3/2013 |
| JP | 2013-149528 A | 8/2013 |
| JP | 5915541 B2 | 5/2016 |
| WO | 2014/185073 A1 | 11/2014 |
| WO | 2015/115665 A1 | 8/2015 |
| WO | 2015/182489 A1 | 12/2015 |

OTHER PUBLICATIONS

The extended European search report issued by the European Patent Office dated May 29, 2019, which corresponds to European Patent Application No. 17750360.4-1103 and is related to U.S. Appl. No. 16/077,376.

International Search Report issued in PCT/JP2017/004943; dated May 9, 2017.

Chulmin Oh et al.; "Silver Stress Migration Bonding Driven by Thermomechanical Stress with Various Substrates" J Mater Sci: Mater Electron (2015) 26:2525-2530; Jan. 28, 2015; pp. 2525-2530.

Teppei Kunimune et al.; "Ultra Thermal Stability of LED Die-Attach Achieved by Pressureless Ag Stress-Migration Bonding at Low Temperature"; Acta Materialia 89 (2015); Feb. 26, 2015; pp. 133-140.

An Office Action issued by the China National Intellectual Property Administration dated Jul. 22, 2020, which corresponds to Chinese Patent Application No. 201780023107.X and is related to U.S. Appl. No. 16/077,376 with English language translation.

* cited by examiner

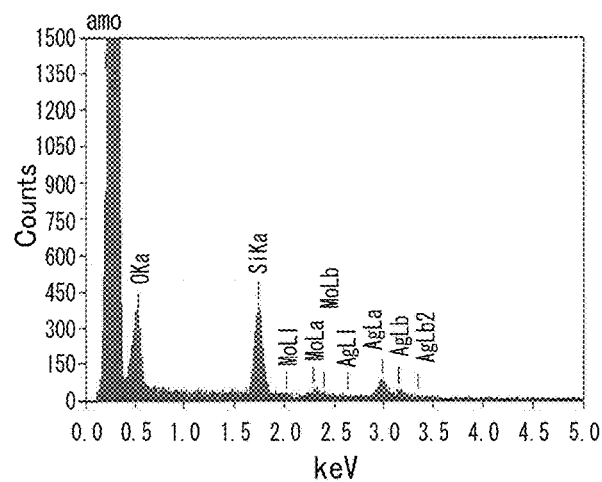 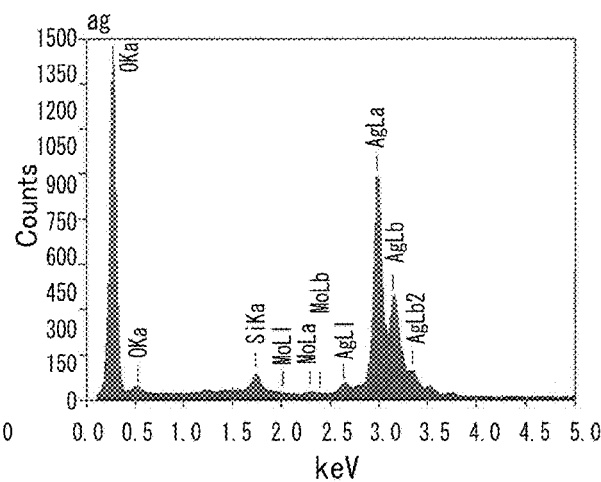
FIG. 14A  FIG. 14B
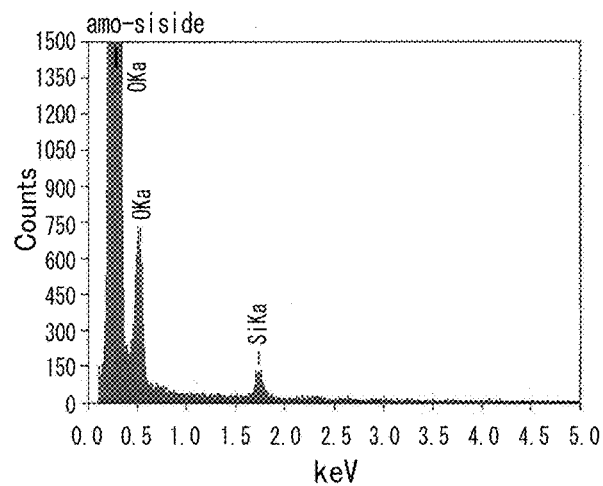 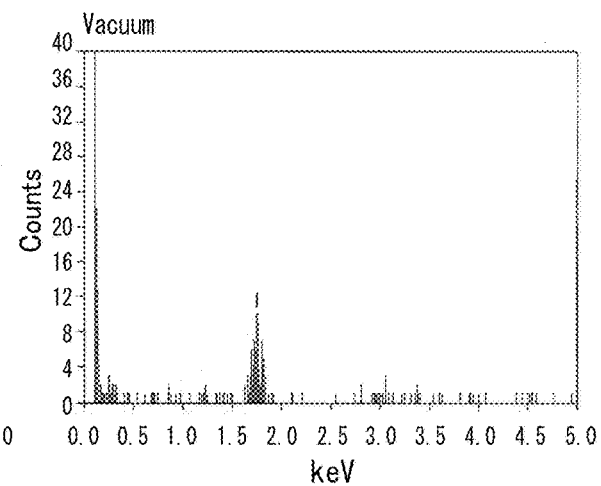
FIG. 14C  FIG. 14D

BONDING MATERIAL, METHOD FOR PRODUCING BONDING MATERIAL, AND METHOD FOR PRODUCING BONDING STRUCTURE

TECHNICAL FIELD

The present invention relates to a bonding material, a method for producing a bonding material, and a method for producing a bonding structure.

BACKGROUND ART

It is known to integrate a plurality of members by bonding the members together while in contact with each other. For example, in a process of mounting a semiconductor element on a substrate, the semiconductor element and the substrate are bonded together with a bonding material.

Traditionally, solder containing lead is widely used as a bonding material. Meanwhile, studies have been recently made on solder that does not contain lead (lead-free solder) from the viewpoint of environmental protection. However, the lead-free solder generally has a melting point higher than that of the solder containing lead. Therefore, when bonding is performed with the lead-free solder under a high temperature, a bonding target may be damaged by thermal stress or a void may be formed at a solder bonding interface.

Therefore, it is considered using a paste containing metal nanoparticles as a bonding material having a low melting point (for example, Patent Literature 1). Patent Literature 1 discloses a method for bonding a semiconductor chip to an insulating substrate. In the method disclosed in Patent Literature 1, a paste is applied to the insulating substrate, thereafter the semiconductor chip is placed on the paste, and heating is performed. The paste disclosed in Patent Literature 1 contains metal nanoparticles, an organic dispersant, a dispersant scavenger, and a volatile organic component. During heating, gas is generated from the paste by volatilization.

CITATION LIST

Patent Literature

Patent Literature 1

Japanese Patent Application Laid-Open Publication No. 2008-10703

SUMMARY OF THE INVENTION

Technical Problem

However, in the method disclosed in Patent Literature 1, mixing of a plurality of components is necessary for preparation of the paste. Therefore, preparation of the paste is laborious and bonding cannot be performed easily. Also, the method disclosed in Patent Literature 1 increases cost.

The present invention was made in view of the foregoing and has its object of providing a bonding material, a method for producing a bonding material, and a method for producing a bonding structure that enable favorable and easy bonding even in a low temperature environment.

Solution to Problem

A bonding material according to the present invention includes an amorphous silver film.

In an embodiment, the bonding material further includes a silver layer in contact with the amorphous silver film.

In an embodiment, the silver layer has any of a micro-crystal structure, a columnar crystal structure, an equiaxed crystal structure, and a mixed grain structure.

In an embodiment, the silver layer has a thickness of at least 10 nm and no greater than 1 mm.

A method for producing a bonding material according to the present invention includes providing a silver layer and forming an amorphous silver film from the silver layer by healing the silver layer.

In an embodiment, the providing a silver layer includes forming the silver layer on a support member by any of sputtering, plating, chemical vapor deposition, and evaporation.

In an embodiment, in the providing a silver layer, the silver layer has any of a micro-crystal structure, a columnar crystal structure, an equiaxed crystal structure, and a mixed grain structure.

In an embodiment, in the forming an amorphous silver film, the amorphous silver film is formed on the silver layer.

In an embodiment, the forming an amorphous silver film includes: disposing a counter member to be opposed to the silver layer; and in a state where the counter member is disposed, forming the amorphous silver film on the counter member by heating the silver layer.

A method for producing a bonding structure according to the present invention includes: providing a first bonding target and a second bonding target; forming a bonding material; forming a layered structure; and bonding. In the forming a bonding material, the bonding material is formed on a surface of at least one bonding target among the first bonding target and the second bonding target. In the forming a layered structure, the layered structure is formed by arranging the first bonding target, the bonding material, and the second bonding target in a layered manner by disposing the bonding material between the first bonding target and the second bonding target. In the bonding, the first bonding target and the second bonding target are bonded via the bonding material by heating the layered structure. The forming a bonding material includes providing a silver layer and forming an amorphous silver film from the silver layer by heating the silver layer.

In an embodiment, in the forming an amorphous silver film, the amorphous silver film is formed before the layered structure is heated.

In an embodiment, the providing a silver layer includes forming the silver layer on the surface of the at least one bonding target. In the forming an amorphous silver film, the amorphous silver film is formed on the silver layer.

In an embodiment, the providing a silver layer includes forming the silver layer on a surface of a member other than the at least one bonding target. The forming an amorphous silver film includes forming the amorphous silver film from the silver layer on the surface of the at least one bonding target.

Advantageous Effects of the Invention

The present invention can provide a bonding material, a method for producing a bonding material, and a method for producing a bonding structure that enable favorable and easy bonding even in a low temperature environment.

BRIEF DESCRIPTION OF DRAWINGS

FIGS. 114 to 11E are schematic diagrams for explaining a method for producing the bonding structure illustrated in FIG. 10.

FIGS. 14A to 14D are graph representations showing results of fluorescent X-ray analysis of P1 to P4 in FIG. 13.

FIG. 16A is a diagram illustrating an amorphous silver film formed by heating in the air. FIG. 16B is an enlarged view of a part of FIG. 16A. FIG. 16C is an enlarged view of a part of FIG. 16B.

FIG. 17A is a diagram illustrating an amorphous silver film formed by heating in a vacuum. FIG. 17B is an enlarged view of a part of FIG. 17A.

DESCRIPTION OF EMBODIMENTS

The following describes embodiments of a bonding material, a method for producing a bonding material, and a method for producing a bonding structure according to the present invention. However, the present invention is by no means limited to the following embodiments. The following embodiments may be altered as appropriate. Note that overlapping description may be omitted as appropriate to avoid redundancy. However, such omission does not limit the gist of the present invention.

Figure 1:
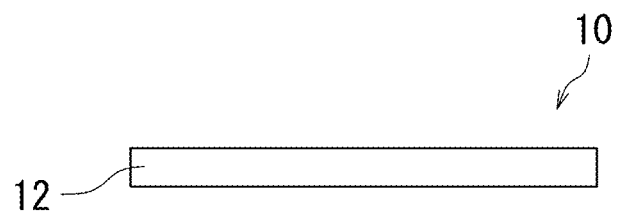
FIG. 1 is a schematic diagram of a bonding material of the present embodiment.

The following describes an embodiment of a bonding material 10 according to the present invention with reference to FIG. 1. FIG. 1 is a schematic diagram of the bonding material 10 of the present embodiment. The bonding material 10 is used for bonding together bonding targets. The bonding material 10 typically has the shape of a thin film.

The bonding material 10 includes an amorphous silver film 12. The amorphous silver film 12 contains amorphous silver as a main component. However, the amorphous silver film 12 may contain impurities other than the amorphous silver. The proportion of the amorphous silver in the amorphous silver film 12 is preferably at least 50% by mass, more preferably at least 80% by mass, and further preferably at least 90% by mass. The thickness of the amorphous silver film 12 is for example at least 10 nm and no greater than 1 µm.

The bonding material 10 typically has two main surfaces. The main surfaces of the bonding material 10 illustrated in FIG. 1 are both out of contact with any other member and exposed. However, at least one of the two main surfaces of the bonding material 10 may be in contact with any other member before the bonding material 10 is brought into contact with a bonding target.

Generally, amorphous silver is known to be relatively unstable. In the present embodiment, the amorphous silver contained in the amorphous silver film 12 is stabilized through crystallization to become crystalline silver when the bonding material 10 is heated. In the present description, a film containing crystalline silver formed by crystallization of the amorphous silver contained in the amorphous silver film 12 may be referred to as a crystalline silver film.

When the bonding material 10 is heated while in contact with a bonding target, the amorphous silver contained in the amorphous silver film 12 crystallizes. As a result, the amorphous silver film 12 changes to a crystalline silver film. In the process of change from the amorphous silver film 12 to the crystalline silver film, the bonding material 10 is combined with the bonding target. Therefore, a bonding structure can be produced using the bonding material 10 of the present embodiment for bonding the bonding target.

Figure 2:
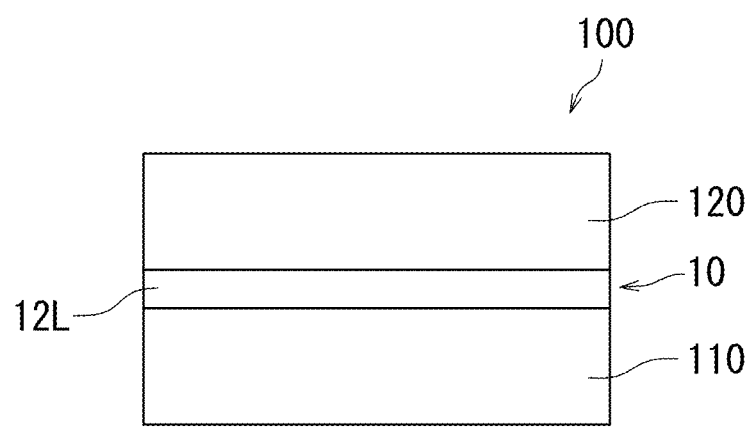
FIG. 2 is a schematic diagram of a bonding structure of the present embodiment.

The following describes an embodiment of a bonding structure 100 according to the present invention with reference to FIG. 2. FIG. 2 is a schematic diagram of the bonding structure 100 of the present embodiment.

The bonding structure 100 includes the bonding material 10, a bonding target 110, and a bonding target 120. The bonding material 10 has the shape of a thin film. In the bonding structure 100, the bonding target 110, the bonding material 10, and the bonding target 120 are layered in the stated order, and the bonding material 10 bonds the bonding target 110 and the bonding target 120 together. The bonding material 10 illustrated in FIG. 2 includes a crystalline silver film 12L. The crystalline silver film 12L is formed by crystallization of the amorphous silver film 12 illustrated in FIG. 1 through heating. Note that in the following description, the bonding target 110 may be referred to as a first bonding target 110 and the bonding target 120 may be referred to as a second bonding target 120.

The first bonding target 110 may be any member. For example, the bonding target 110 is a substrate. The substrate may be a metal substrate or an insulating substrate. Examples of materials of the metal substrate include copper, zinc, gold, palladium, aluminum, nickel, cobalt, iron, alumina, tungsten, niobium, molybdenum, titanium, stainless steel, Invar alloys (alloys containing iron, nickel, manganese, and carbon), and Kovar alloys (alloys containing iron, nickel, cobalt, manganese, and silicon). Examples of materials of the insulating substrate include glass, silica glass, silicon, carbon, ceramics, silicon carbide, gallium nitride, gallium nitride formed on silicon, silicon nitride, and aluminum nitride.

The second bonding target 120 may be any member. For example, the bonding target 120 is a substrate. The substrate may be a metal substrate or an insulating substrate. Examples of materials of the second bonding target 120 are similar to the above-listed materials of the bonding target 110.

Alternatively, the second bonding target 120 may be a semiconductor element or a wiring member. Examples of materials of the semiconductor element include silicon, carbon, silicon carbide, gallium nitride, gallium nitride formed on silicon, silicon nitride, and aluminum nitride. Examples of materials of the wiring member include copper, zinc, gold, palladium, aluminum, niobium, nickel, cobalt, molybdenum, tungsten, titanium, and iron. Copper or iron is preferable as a metal forming the wiring member in terms of their excellent versatility and cost performance and ease of bonding with the bonding material 10.

In the bonding structure 100 of the present embodiment, the bonding material 10 includes the crystalline silver film formed by crystallization of the amorphous silver film 12, and the bonding material 10 bonds the bonding target 110 and the bonding target 120 together. The bonding target 110 preferably includes an amorphous film at a surface of the bonding target 110 in contact with the bonding material 10. Also, the bonding target 120 preferably includes an amorphous film at a surface of the bonding target 120 in contact with the bonding material 10.

As described above, the crystalline silver film 12L is formed by crystallization of the amorphous silver film 12. The amorphous silver film 12 is formed from a silver layer, for example. In one example, the amorphous silver film 12 is formed from a silver layer on a surface of the silver layer. Alternatively, the amorphous silver film 12 may be formed from a silver layer on a surface of a member other than the silver layer.

In the bonding structure 100 of the present embodiment, the first bonding target 110 and the second bonding target 120 are bonded using the bonding material 10 including the amorphous silver film 12, as described above. Crystallization of the amorphous silver film 12 proceeds at a temperature lower than a general sintering temperature. Therefore, the bonding structure 100 of the present embodiment can be favorably produced through bonding even in a lower temperature environment. Also, even if either of the first bonding target 110 and the second bonding target 120 has relatively low heat resistance, the first bonding target 110 and the second bonding target 120 can be favorably bonded. Furthermore, a large-scale apparatus such as a heating furnace is not necessary. Therefore, bonding can be performed by a simple process at a low cost. Also, bonding can be easily performed using a versatile metal.

The following describes an example of methods for producing the bonding structure 100 according to the present embodiment with reference to FIGS. 3A to 3D. The bonding structure 100 includes the bonding material 10 and the bonding targets 110 and 120 described above. Overlapping description will be omitted to avoid redundancy.

Figure 3A:
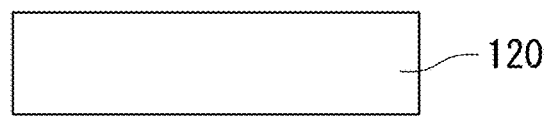
FIGS. 3A to 3D are schematic diagrams for explaining a method for producing the bonding structure of the present embodiment.
Figure 3A:
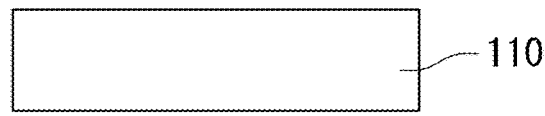

As illustrated in FIG. 3A, the first bonding target 110 and the second bonding target 120 are provided.

Figure 3B:
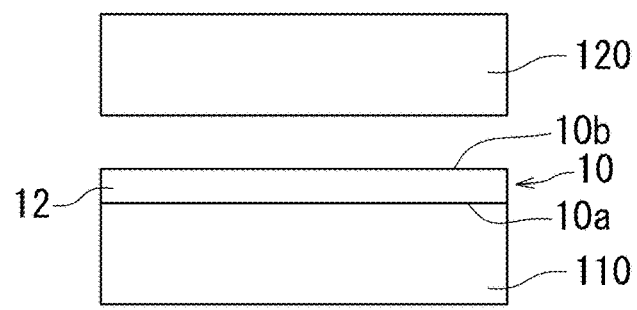

As illustrated in FIG. 3B, the bonding material 10 is formed on at least one bonding target among the first bonding target 110 and the second bonding target 120.

In the example illustrated in FIG. 3B, the bonding material 10 is formed on a surface of the first bonding target 110. The bonding material 10 has the shape of a thin film. The bonding material 10 has a main surface 10a and a main surface 10b. In the example illustrated in FIG. 3B, the main surface 10a of the bonding material 10 is in contact with the first bonding target 110 and the main surface 10b of the bonding material 10 is exposed.

The bonding material 10 includes the amorphous silver film 12. The amorphous silver film 12 is exposed at the main surface 10b of the bonding material 10. Note that the amorphous silver film 12 may be directly in contact with the first bonding target 110.

Alternatively, the amorphous silver film 12 may be indirectly in contact with the first bonding target 110 via another layer interposed therebetween. For example, an adhesive layer may be provided between the amorphous silver film 12 and the first bonding target 110. Examples of materials forming the adhesive layer include titanium and titanium nitride. The thickness of the adhesive layer is for example at least 0.01 μm and no greater than 0.05 μm. Alternatively, a silver layer may be provided between the amorphous silver film 12 and the first bonding target 110 as described later.

Note that the first bonding target 110 and the bonding material 10 may be exposed to an oxygen atmosphere as necessary after formation of the bonding material 10 on the surface of the first bonding target 110.

Figure 3C:
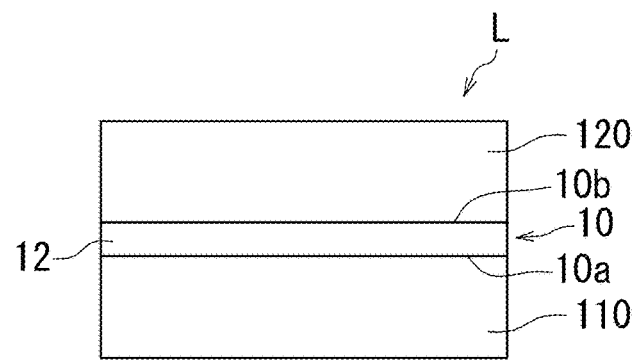

As illustrated in FIG. 3C, a layered structure L is formed by disposing the bonding material 10 between the first bonding target 110 and the second bonding target 120. The second bonding target 120 is in contact with the main surface 10b of the bonding material 10. In the layered structure L, the amorphous silver film 12 included in the bonding material 10 is in contact with the second bonding target 120. In the layered structure L, the first bonding target 110 and the second bonding target 120 are layered with the bonding material 10 interposed therebetween.

Figure 3D:
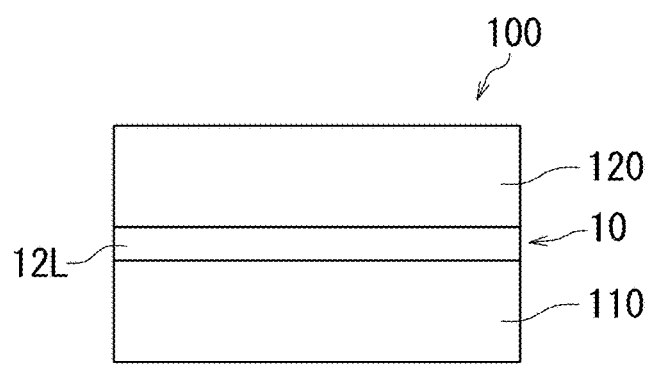

Through healing of the layered structure L, the crystalline silver film 12L is formed from the amorphous silver film 12 included in the bonding material 10, whereby the bonding structure 100 is obtained as illustrated in FIG. 3D. The layered structure L is heated through use of a heating plate or a heating furnace, or by rapid thermal annealing (RTA), for example.

The layered structure L is heated at a heating temperature that is preferably at least 100° C. and no higher than 400° C., and more preferably at least 150° C. and no higher than 300° C. The layered structure L is heated for a heating period that is preferably at least 15 minutes and no longer than 5 hours, and more preferably at least 30 minutes and no longer than 3 hours, for example.

The layered structure L may be heated under an atmospheric pressure or in a vacuum. Alternatively, the layered structure L may be heated in an inert gas atmosphere or a reducing gas (for example, argon gas, nitrogen gas, hydrogen gas, or formic acid gas) atmosphere.

When the layered structure L is heated, crystallization of the amorphous silver film 12 proceeds and the crystalline silver film 12L is formed from the amorphous silver film 12. When the amorphous silver film 12 included in the bonding material 10 changes to the crystalline silver film 12L, the crystalline silver film 12l, included in the bonding material 10 and the second bonding target 120 are combined at an interface therebetween, whereby the first bonding target 110 and the second bonding target 120 are bonded by the bonding material 10. Through the above, the bonding structure 100 is produced.

Note that the first bonding target 110 and the second bonding target 120 may be bonded together by applying a pressure to the layered structure L. However, in the present embodiment, the bonding structure 100 is produced using the bonding material IC) including the amorphous silver film 12. Therefore, bonding can be performed through a relatively low pressure. For example, bonding can be performed without application of pressure or through a pressure of no greater than 1 MPa.

According to the present embodiment, the first bonding target 110 and the second bonding target 120 are bonded together using the bonding material 10 including the amorphous silver film 12. Therefore, bonding can be favorably performed at a relatively low heating temperature. As a result, it is possible to prevent the first bonding target 110 and/or the second bonding target 120 from being damaged by heat during heating. Also, it is possible to prevent formation of a void in the vicinity of a joint between the first bonding target 110 and the second bonding target 120.

Sometimes the thickness of the amorphous silver film 12 increases when the layered structure L is heated. In such a case, the layered structure L may be further heated to change the amorphous silver film 12 to the crystalline silver film 12L.

Although the bonding material 10 is formed on the first bonding target 110 among the first bonding target 110 and the second bonding target 120 in the above-described example, the present invention is not limited to this configuration. The bonding material 10 may be formed on the second bonding target 120 among the first bonding target 110 and the second bonding target 120. However, in a case where the bonding material 10 is formed on one of the first bonding target 110 and the second bonding target 120, the bonding material 10 is preferably formed on a larger one of the first bonding target 110 and the second bonding target 120.

Alternatively, the bonding material 10 may be formed on each of the first bonding target 110 and the second bonding target 120.

The following describes another example of methods for producing the bonding structure 100 according to the present embodiment with reference to FIGS. 4A to 4D. The method which will be described with reference to FIGS. 4A to 4D is similar to the method for producing the bonding structure 100 described above with reference to FIGS. 3A to 3D in all aspects other than that bonding materials are respectively formed on the first bonding target 110 and the second bonding target 120. Therefore, overlapping description will be omitted to avoid redundancy.

Figure 4A:
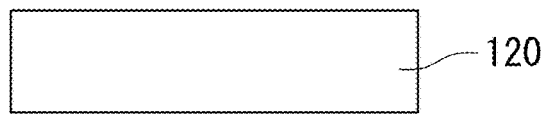
FIGS. 4A to 4D are schematic diagrams for explaining a method for producing the bonding structure of the present embodiment.
Figure 4A:

As illustrated in FIG. 4A, the first bonding target 110 and the second bonding target 120 are provided.

Figure 4B:
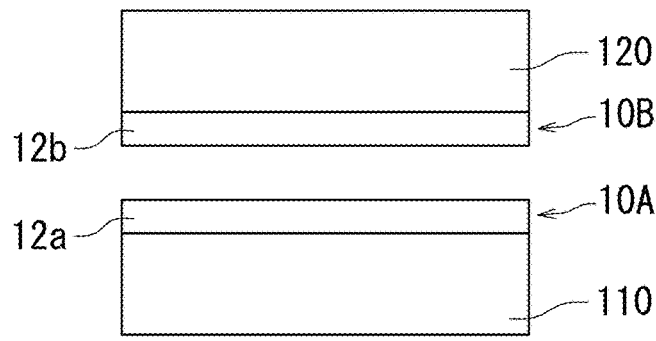

As illustrated in FIG. 4B, bonding materials are respectively formed on the first bonding target 110 and the second bonding target 120. In the example illustrated in FIG. 4B, a bonding material 10A is formed on a surface of the first bonding target 110 and a bonding material 10B is formed on a surface of the second bonding target 120. The bonding material 10A includes an amorphous silver film 12*a* and the bonding material 10B includes an amorphous silver film 12*b*.

The amorphous silver film 12*a* included in the bonding material 10A is exposed. Note that the amorphous silver film 12*a* may be directly in contact with the first bonding target 110 or indirectly in contact with the first bonding target 110 via another layer interposed therebetween. For example, an adhesive layer may be provided between the amorphous silver film 12*a* and the first bonding target 110. Examples of materials forming the adhesive layer include titanium and titanium nitride. The thickness of the adhesive layer is for example at least 0.01 μm and no greater than 0.05 μm. Alternatively, a silver layer may be provided between the amorphous silver film 12*a* and the first bonding target 110 as described later.

The amorphous silver film 12*b* included in the bonding material 10B is exposed. Note that the amorphous silver film 12*b* may be directly in contact with the second bonding target 120 or indirectly in contact with the second bonding target 120 via another layer interposed therebetween. For example, an adhesive layer may be provided between the amorphous silver film 12*b* and the second bonding target 120. Alternatively, a silver layer may be provided between the amorphous silver film 12*b* and the second bonding target 120 as described later.

Note that the first bonding target 110 and the bonding material 10A may be exposed to an oxygen atmosphere as necessary after formation of the bonding material 10A on the surface of the first bonding target 110. Similarly, the second bonding target 120 and the bonding material 10B may be exposed to an oxygen atmosphere as necessary after formation of the bonding material 10B on the surface of the second bonding target 120.

Figure 4C:
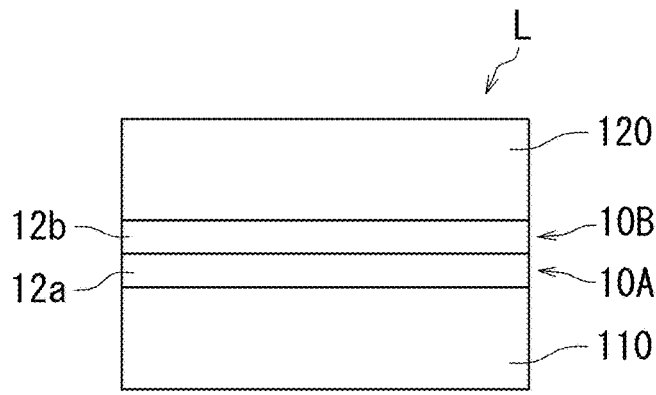

As illustrated in FIG. 4C, a layered structure L is formed by disposing the bonding materials 10A and 10B between the first bonding target 110 and the second bonding target 120. In the layered structure L, the bonding material 104 faces the bonding material 103, and the amorphous silver film 12*a* is in contact with the amorphous silver film 12*b*. In the layered structure L, the first bonding target 110 and the second bonding target 120 are layered with the bonding materials 10A and 10B interposed therebetween.

Figure 4D:
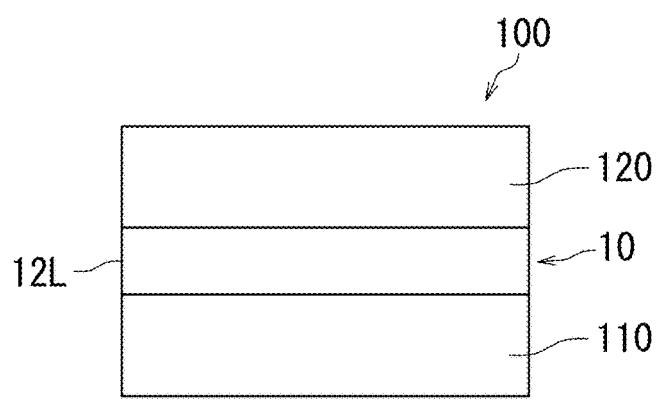

Through heating of the layered structure L, the crystalline silver film 12L is formed from the amorphous silver films 12*a* and 12*b* included in the bonding materials 104 and 103, whereby the bonding structure 100 is obtained as illustrated in FIG. 4D. When the layered structure L is heated, crystallization of the amorphous silver films 12*a* and 12*b* proceeds and an interface between the amorphous silver films 12*a* and 12*b* disappears. As a result, the crystalline silver film 12L is formed from the amorphous silver films 12*a* and 12*b*.

When the amorphous silver films 12*a* and 12*b* included in the bonding materials 10 change to the crystalline silver film 12L, the bonding materials 10A and 10B are integrated to be the bonding material 10, and the first bonding target 110 and the second bonding target 120 are bonded together by the bonding material 10. Through the above, the bonding structure 100 is produced. Note that an interface between two layers derived from the bonding materials 10A and 10B may be clearly identifiable in the bonding material 10 after heating. Alternatively, the interface may not be identifiable.

The layered structure L is heated through use of a heating plate or a heating furnace, or by rapid thermal annealing, for example. The layered structure L is heated at a heating temperature that is preferably at least 100° C. and no higher than 400° C., and more preferably at least 150° C. and no higher than 300° C.

The layered structure L may be heated under an atmospheric pressure or in a vacuum. Alternatively, the layered structure L may be heated in an inert gas atmosphere or a reducing gas (for example, argon gas, nitrogen gas, hydrogen gas, or formic acid gas) atmosphere.

Note that the first bonding target 110 and the second bonding target 120 may be bonded together by applying a pressure to the layered structure L. However, the production method of the present embodiment uses the bonding materials 10A and 10B including the amorphous silver films 12*a* and 12*b*. Therefore, bonding can be performed through a relatively low pressure. For example, bonding can be performed without application of pressure or through a pressure of no greater than 1 MPa.

According to the present embodiment, the first bonding target 110 and the second bonding target 120 are bonded together using the bonding materials 10A and 10B including the amorphous silver films 12a and 12b. Therefore, bonding can be favorably performed at a relatively low heating temperature. As a result, it is possible to prevent the first bonding target 110 and/or the second bonding target 120 from being damaged by heat during heating. Also, it is possible to prevent formation of a void in the vicinity of a joint between the first bonding target 110 and the second bonding target 120.

In the examples described above with reference to FIGS. 3B and 4B, the bonding materials 10, 10A, and 10B are formed on the first bonding target 110 and/or the second bonding target 120. In the present embodiment, the amorphous silver films 12, 12a, and 12b included in the bonding materials 10 can each be formed from a silver layer as described above.

Figure 5A:
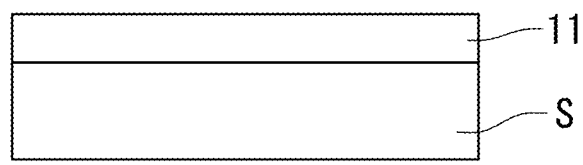
FIGS. 5A and 5B are schematic diagrams for explaining a method for producing the bonding material of the present embodiment.
Figure 5B:
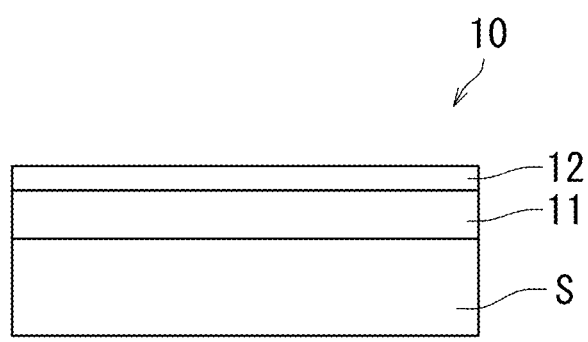
Figure 6:
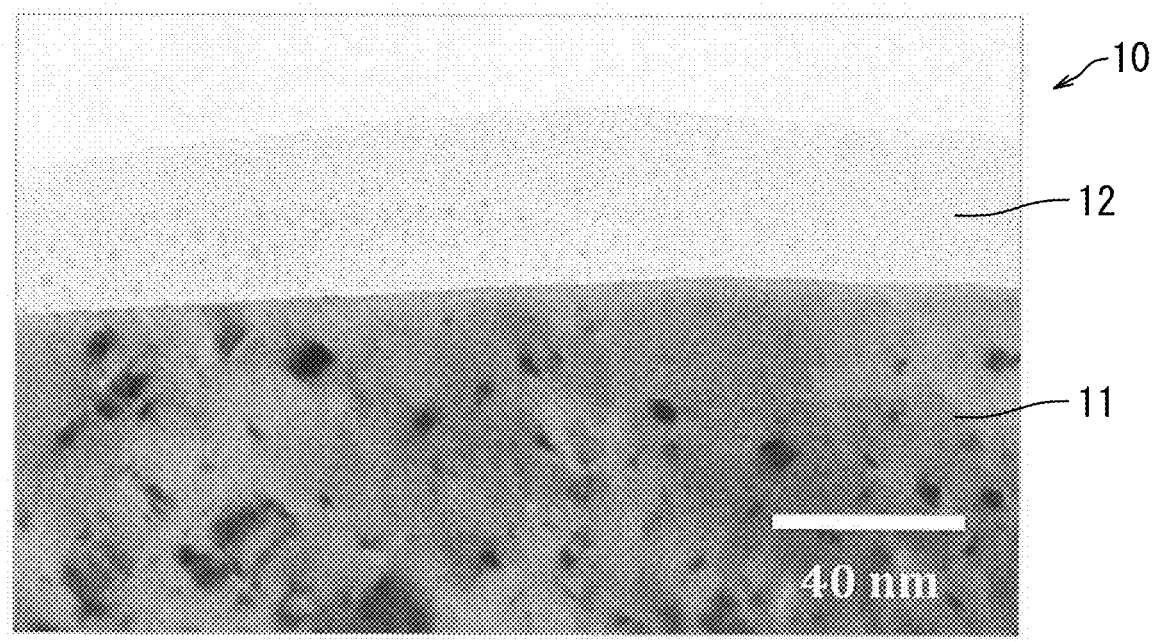
FIG. 6 is a diagram illustrating the bonding material of the present embodiment.

The following describes an example of methods for producing the bonding material 10 of the present embodiment with reference to FIGS. 5A, 5B, and 6.

As illustrated in FIG. 5A, a silver layer 11 is formed on a support member S. For example, the silver layer 11 is supported by the support member S.

The silver layer 11 is formed on the support member S by sputtering, plating, chemical vapor deposition (CVD), or evaporation. Note that the sputtering method is not specifically limited. For example, either of radio frequency (RF) sputtering and direct current (DC) sputtering may be adopted. Also, the plating method is not specifically limited. For example, either of electrolytic plating and nonelectrolytic plating may be adopted. Also, the evaporation method is not specifically limited. For example, vacuum evaporation performed by resistive heating may be adopted.

The support member S for example has the shape of a substrate. Preferably, a thermal expansion coefficient of a material forming the support member S is smaller than a thermal expansion coefficient of silver. Note that the support member S is preferably either of the bonding targets 110 and 120 included in the bonding structure 100 described with reference to FIG. 2.

The silver layer 11 preferably has a micro-crystal structure (i.e., in a state of micro-crystals of about submicron order), a columnar crystal structure, an equiaxed crystal structure, or a mixed grain structure. The thickness of the silver layer 11 is preferably at least 10 nm and no greater than 1 mm, and more preferably at least 100 nm and no greater than 30 µm.

Through heating of the silver layer 11, the amorphous silver film 12 is formed from the silver layer 11, whereby the bonding material 10 is obtained as illustrated in FIG. 5B. In the example illustrated in FIG. 5B, the amorphous silver film 12 is formed on a surface of the silver layer 11 through heating of the silver layer 11.

The silver layer 11 is heated through use of a heating plate or a heating furnace, or by rapid thermal annealing, for example. The silver layer 11 may be heated under an atmospheric pressure, in a vacuum, in an ultrahigh vacuum, under a reduced pressure, or in an oxygen atmosphere.

The silver layer 11 is heated for a heating period that is preferably at least 1 millisecond and no longer than 1 hour, and more preferably at least 1 minute and no longer than 45 minutes, for example. The heating period of the silver layer 11 is preferably shorter than the heating period of the layered structure L described above with reference to FIGS. 3D and 4D.

Also, the silver layer 11 is heated at a heating temperature of at least 200° C. and no higher than 500° C., for example. The heating temperature of the silver layer 11 is preferably higher than the heating temperature of the layered structure L described above with reference to FIGS. 3D and 4D.

When the silver layer 11 is heated, stress is mitigated within the silver layer 11 and the amorphous silver film 12 is formed from the silver layer 11. The thickness of the amorphous silver film 12 is for example at least 10 nm and no greater than 1 µm. Note that when the bonding material 10 is heated while in contact with another member, crystallization of the amorphous silver film 12 proceeds and a joint is formed as a result, as described above with reference to FIGS. 3D and 4D.

FIG. 6 illustrates the bonding material 10 of the present embodiment. The amorphous silver film 12 illustrated in FIG. 6 was formed on the silver layer 11 by heating the silver layer 11 having a thickness of approximately 1 µm at a temperature of 250° C. for 5 minutes. The amorphous silver film 12 had a thickness of approximately 30 nm.

In FIG. 6, black spots within the amorphous silver film 12 indicate minute seed crystals. As the heating period of the silver layer 11 increases, the thickness of the amorphous silver film 12 increases and/or crystallization of the amorphous silver film 12 proceeds.

The amorphous silver film 12 is formed from the silver layer 11 as described above. According to the present embodiment, the bonding material 10 including the amorphous silver film 12 can be produced. Note that not only the amorphous silver film 12 but also the silver layer 11 may be used as the bonding material 10 for bonding of bonding targets. Alternatively, not only the amorphous silver film 12 and the silver layer 11 but also the support member S may be used as the bonding material 10.

The amorphous silver film 12 is typically thinner than the silver layer 11. Accordingly, in a configuration in which the bonding material 10 includes the amorphous silver film 12 and the silver layer 11, it may appear that only the silver layer 11 is combined with the bonding target. However, the crystalline silver film 12L formed by crystallization of the amorphous silver film 12 actually contributes to bonding to a great extent.

The amorphous silver film 12 is formed from the silver layer 11 through heating of the silver layer 11. However, the heating period of the silver layer 11 is preferably set so as not to be excessively long. If the heating period of the silver layer 11 is excessively long, crystallization of the amorphous silver film 12 may proceed to reduce a bonding function of the bonding material 10. For a similar reason, the heating temperature of the silver layer 11 is preferably set so as not to be excessively high.

In production of the bonding material 10, the silver layer 11 is typically supported by the support member S. The support member S is formed of an insulating material or a conductive material. Preferably, a thermal expansion coefficient of the support member S is smaller than the thermal expansion coefficient of silver. For example, a ratio of the thermal expansion coefficient of silver to the thermal expansion coefficient of the material of the support member S (thermal expansion coefficient of silver/thermal expansion coefficient of the material of the support member 5) is preferably at least 2.0.

The thermal expansion coefficient of silver is $18.9 \times 10^{-6}$. Note that a thermal expansion coefficient referred to herein is a linear expansion coefficient, and the unit of the thermal expansion coefficient is "1/K".

The following lists examples of thermal expansion coefficients of respective materials that may be adopted as materials of the support member S. Note that each of the following thermal expansion coefficients is a linear expansion coefficient, and the unit of the thermal expansion coefficient is "1/K".

Silicon: $2.6 \times 10^{-6}$
Silicon carbide: $3.7 \times 10^{-6}$
Gallium nitride: $3.0 \times 10^{-6}$
Silicon nitride: $3.0 \times 10^{-6}$
Aluminum nitride: $5.0 \times 10^{-6}$
Alumina: $7.2 \times 10^{-6}$
Aluminum: $23.0 \times 10^{-6}$
Iron: $12.0 \times 10^{-6}$
Cobalt: $13.0 \times 10^{-6}$
Nickel: $12.8 \times 10^{-6}$
Gold: $14.3 \times 10^{-6}$
Copper: $16.8 \times 10^{-6}$
Palladium: $11.8 \times 10^{-6}$
Tungsten: $4.5 \times 10^{-6}$
Molybdenum: $4.8 \times 10^{-6}$
Niobium: $8.0 \times 10^{6}$
Titanium: $11 \times 10^{-6}$ As described above, the amorphous silver film 12 is formed from the silver layer 11 through heating of the silver layer 11. The mechanism of formation of the amorphous silver film 12 is considered as follows. The following describes the mechanism of formation of the amorphous silver film 12 with reference to FIGS. 7A and 7B.

Figure 7A:
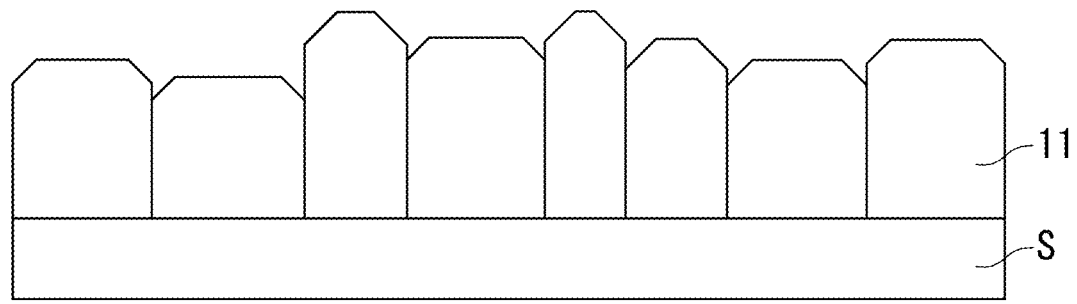
FIGS. 7A and 7B are schematic diagrams for explaining a method for producing the bonding material of the present embodiment.

As illustrated in FIG. 7A, the silver layer 11 is formed on the support member S. The silver layer 11 illustrated in FIG. 7A has a micro-crystal structure, a columnar crystal structure, an equiaxed crystal structure, or a mixed grain structure. The silver layer 11 is for example formed by sputtering, plating, chemical vapor deposition, or evaporation.

Figure 7B:
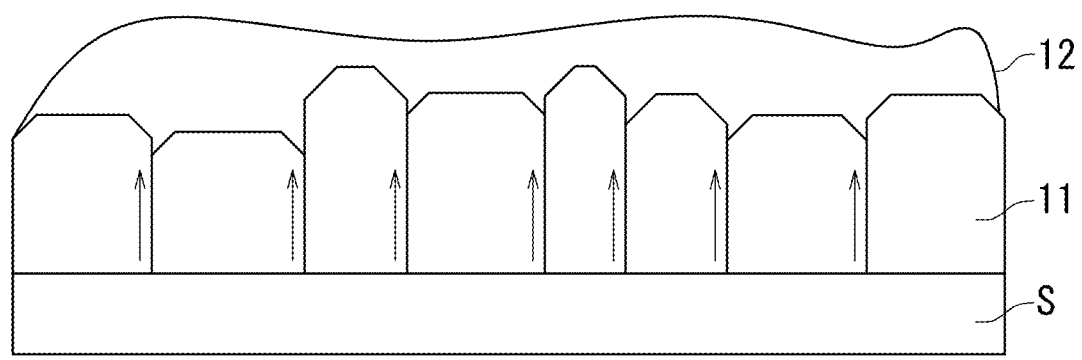

Through heating of the silver layer 11, a thin amorphous silver film 12 is formed on the silver layer 11 as illustrated in FIG. 7B. The silver layer 11 is heated at a heating temperature of at least 200° C. and no higher than 500° C., for example. The amorphous silver film 12 is thought to be formed from the silver layer 11 in a manner described below.

Silver oxide generally has a melting point that is considerably lower than that of silver. Therefore, when the silver layer 11 is heated, silver oxide contained in the silver layer 11 melts within the silver layer 11. The molten silver oxide in a liquid state moves to a surface of the silver layer 11 via grain boundaries within the silver layer 11 as indicated by arrows in FIG. 7B. When the silver oxide reaches the surface of the silver layer 11, the silver oxide is reduced and separated into silver and oxygen. Note that stress is mitigated within the silver layer 11 by the melting and movement of the silver oxide. Therefore, a path made within the silver layer 11 by the movement of the silver oxide in the liquid state is closed by adjacent silver crystals.

The silver oxide in the liquid state moved from the inside of the silver layer 11 to the surface of the silver layer 11 is reduced and gasified at the surface of the silver layer 11. As a result, gasified silver spouts out from the silver layer 11 toward a counter member CS. However, when the silver spouts out weakly, the silver falls down on the silver layer 11 to be deposited in an amorphous state. As described above, the amorphous silver film 12 can be formed on the counter member CS disposed apart from the silver layer 11 through heating of the silver layer 11.

In a case where the silver layer 11 has the columnar crystal structure, the silver separated at the surface of the silver layer 11 disperses along the surface of the silver layer 11 or along crystal grain boundaries. Therefore, amorphous silver can be more easily formed at the surface of the silver layer 11. As described above, the amorphous silver film 12 can be formed on the silver layer 11 through heating of the silver layer 11.

In the example described above with reference to FIGS. 5A to 7B, the amorphous silver film 12 is formed on the silver layer 11 from which the amorphous silver film 12 derives. However, the present invention is not limited to this configuration. The amorphous silver film 12 may be formed on a member other than the silver layer 11. For example, the amorphous silver film 12 may be formed on a counter member by heating the silver layer 11 in a state where the counter member is opposed to the silver layer 11.

Figure 8A:
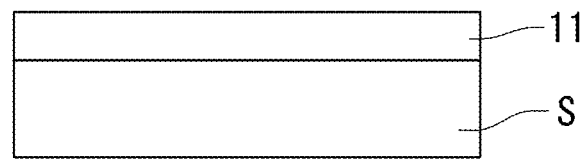
FIGS. 8A to 8C are schematic diagrams for explaining a method for producing the bonding material of the present embodiment.
Figure 8B:
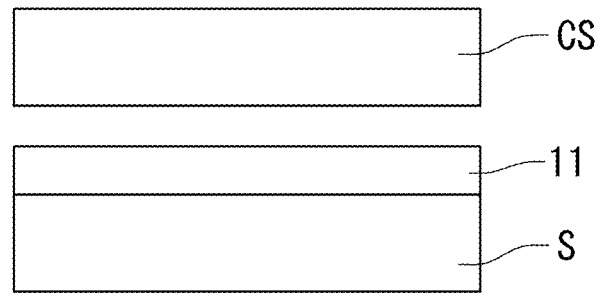
Figure 8C:
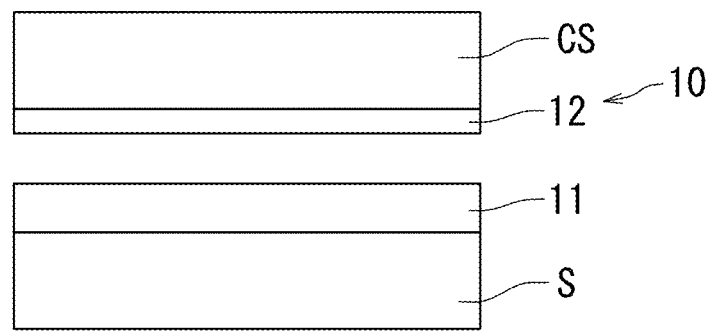

The following describes another example of methods for producing the bonding material 10 of the present embodiment with reference to FIGS. 8A to 8C. The production method which will be described with reference to FIGS. 8A to 8C is similar to the production method described above with reference to FIGS. 5A to 7B in all aspects other than that the amorphous silver film 12 is formed on a counter member. Therefore, overlapping description will be omitted to avoid redundancy.

As illustrated in FIG. 8A, the silver layer 11 is formed on the support member S. The silver layer 11 illustrated in FIG. 8A has a micro-crystal structure, a columnar crystal structure, an equiaxed crystal structure, or a mixed grain structure. The silver layer 11 is for example formed by sputtering, plating, chemical vapor deposition, or evaporation. The thickness of the silver layer 11 is preferably at least 10 nm and no greater than 1 mm, and more preferably at least 100 nm and no greater than 30 µm.

As illustrated in FIG. 8B, a counter member CS is disposed apart from the silver layer 11 so as to be opposed to the silver layer 11. The distance between the counter member CS and the silver layer 11 is preferably at least 100 nm and no greater than 20 cm, and more preferably at least 1 µm and no greater than 10 cm, for example.

Similarly to the support member S described above with reference to FIGS. 7A and 7B, the counter member CS is formed of a material that preferably has a thermal expansion coefficient smaller than that of silver. For example, a ratio of the thermal expansion coefficient of silver to the thermal expansion coefficient of the material of the counter member CS (thermal expansion coefficient of silver/thermal expansion coefficient of the material of the counter member CS) is preferably at least 2.0. The counter member CS is for example a metal substrate. The counter member CS is for example formed of gold, copper, or nickel. Note that the counter member CS is preferably either of the bonding targets 110 and 120 included in the bonding structure 100 described with reference to FIG. 2.

Through heating of the silver layer 11, the amorphous silver film 12 is formed on the counter member CS, whereby the bonding material 10 is obtained as illustrated in FIG. 8C. When the silver layer 11 is heated, fine particles of amorphous silver generated from the silver layer 11 spout toward the counter member CS. As a result, the amorphous silver film 12 is formed on the counter member CS.

The silver layer 11 may be heated through use of a heating plate or a heating furnace, or by rapid thermal annealing, for example. The silver layer 11 may be heated under an atmospheric pressure, in a vacuum, in an ultrahigh vacuum, under a reduced pressure, or in an oxygen atmosphere.

The silver layer 11 is heated for a heating period that is preferably at least 1 millisecond and no longer than 1 hour, and more preferably at least 1 minute and no longer than 45 minutes, for example. The heating period of the silver layer 11 is preferably shorter than the heating period of the layered structure L described above with reference to FIGS. 3D and 4D.

The silver layer 11 is heated at a heating temperature that is at least 200° C. and no higher than 500° C., for example. The heating temperature of the silver layer 11 is preferably higher than the heating temperature of the layered structure L described above with reference to FIGS. 3D and 4D.

As described above, the amorphous silver film 12 can be formed on the counter member CS disposed apart from the silver layer 11 through heating of the silver layer 11. The mechanism of formation of the amorphous silver film 12 is considered as follows. The following describes the mechanism of formation of the amorphous silver film 12 with reference to FIGS. 9A and 9B.

Figure 9A:
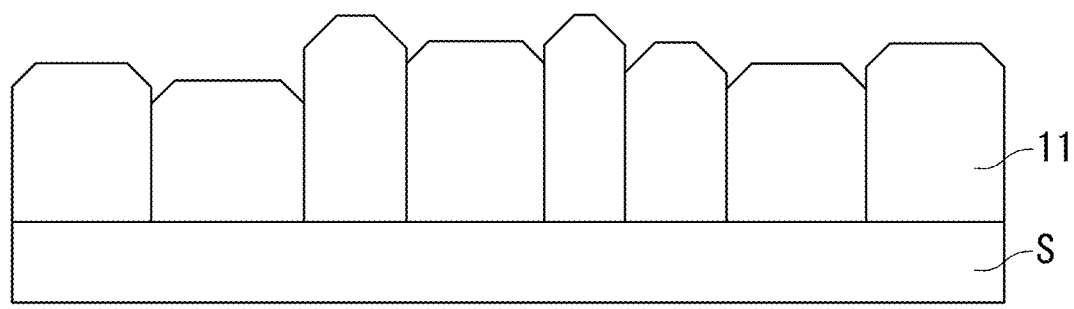
FIGS. 9A and 9B are schematic diagrams for explaining a method for producing the bonding material of the present embodiment.

As illustrated in FIG. 9A, the silver layer 11 is formed on the support member S. The silver layer 11 illustrated in FIG. 9A has a micro-crystal structure, a columnar crystal structure, an equiaxed crystal structure, or a mixed grain structure. Further, the counter member CS is disposed apart from the silver layer 11 as illustrated in FIG. 9A.

Figure 9B:
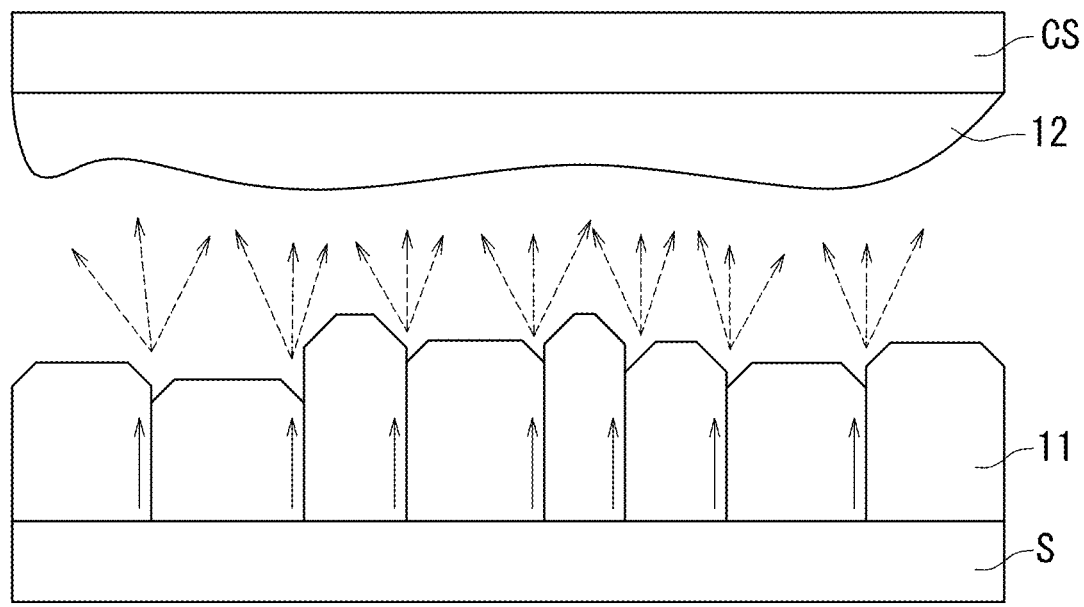

Through heating of the silver layer 11, the amorphous silver film 12 is formed on the counter member CS as illustrated in FIG. 9B. The heating temperature of the silver layer 11 is for example at least 200° C. and no higher than 500° C. The amorphous silver film 12 is thought to be formed from the silver layer 11 in a manner described below.

Silver oxide generally has a melting point that is considerably lower than that of silver. Therefore, when the silver layer 11 is heated, silver oxide contained in the silver layer 11 melts within the silver layer 11. The molten silver oxide in a liquid state moves to a surface of the silver layer 11 via grain boundaries within the silver layer 11 as indicated by arrows in FIG. 9B. The silver oxide is separated into silver and oxygen at the surface of the silver layer 11. Note that stress is mitigated within the silver layer 11 by the melting and movement of the silver oxide. Therefore, a path made within the silver layer 11 by the movement of the silver oxide in the liquid state is closed by adjacent silver crystals.

The silver oxide in the liquid state moved from the inside of the silver layer 11 to the surface of the silver layer 11 is reduced and gasified at the surface of the silver layer 11. As a result, gasified silver spouts out from the silver layer 11 toward the counter member CS. Silver reached the counter member CS is cooled and deposited in an amorphous state. As described above, the amorphous silver film 12 can be formed on the counter member CS disposed apart from the silver layer 11 through heating of the silver layer 11.

As described above with reference to FIGS. 5A to 9B, in a case where the amorphous silver film 12 is formed from the silver layer 11, the amorphous silver film 12 can be formed on the silver layer 11 or on the counter member CS disposed apart from the silver layer 11. Note that the place where the amorphous silver film 12 is formed can be controlled according to an atmosphere in which the silver layer 11 is heated and/or orientation of the silver layer 11 during heating of the silver layer 11.

For example, in a situation in which the pressure around the silver layer 11 is relatively low during heating of the silver layer 11, silver strongly spouts out from the silver layer 11 and travels from the silver layer 11 to reach the counter member CS. By contrast, in a situation in which the pressure around the silver layer 11 is relatively high during heating of the silver layer 11, silver does not spout out from the silver layer 11 or weakly spouts out from the silver layer 11 to be deposited on the silver layer 11.

In a situation in which the silver layer 11 faces downwards (vertically downwards) during heating of the silver layer 11, amorphous silver strongly spouts out from the silver layer 11 and travels from the silver layer 11 to reach the counter member CS. By contrast, in a situation in which the silver layer 11 faces upwards (vertically upwards), amorphous silver does not spout out from the silver layer 11 or weakly spouts out from the silver layer 11 to be deposited on the silver layer 11.

In the examples described above with reference to FIGS. 3D and 4D, the amorphous silver film 12 included in the bonding material 10 is crystallized by heating. Actually, however, crystallization of the amorphous silver film 12 may proceed in the bonding material 10 by merely leaving the amorphous silver film 12 at room temperature for a long period of time. Therefore, it is preferable to start bonding using the bonding material 10 as soon as possible after production of the bonding material 10 including the amorphous silver film 12. Also, in a case where the bonding material 10 is preserved after formation of the amorphous silver film 12, the bonding material 10 is preferably preserved in an environment at a temperature lower than room temperature.

In the examples described above, silver oxide contained in the silver layer 11 melts by healing and the silver oxide in the liquid state moves to the surface of the silver layer 11 via crystal grain boundaries within the silver layer 11 and is gasified. However, the mechanism of movement of the silver oxide or silver within the silver layer 11 is not limited to this mechanism. The silver oxide contained in the silver layer 11 may move to the surface of the silver layer 11 via grain boundaries within the silver layer 11 without being gasified. In any case, when the silver layer 11 is heated, stress is mitigated within the silver layer 11 and a portion of fine particles within the silver layer 11 moves to the surface of the silver layer 11. As described above, formation of the amorphous silver film 12 is accompanied by stress migration.

Note that it is generally known that stress migration may cause generation of a detect (such as a void or a crack), resulting in a malfunction of a semiconductor device or the like. Also, a crystalline silver film formed by crystallization of the amorphous silver film 12 on the silver layer 11 may be generally called hillock.

In the examples described above with reference to FIGS. 1 to 9B, two bonding targets are bonded together by the same bonding material or a single bonding material formed by integration of bonding materials. However, the present invention is not limited to this configuration.

Figure 10:
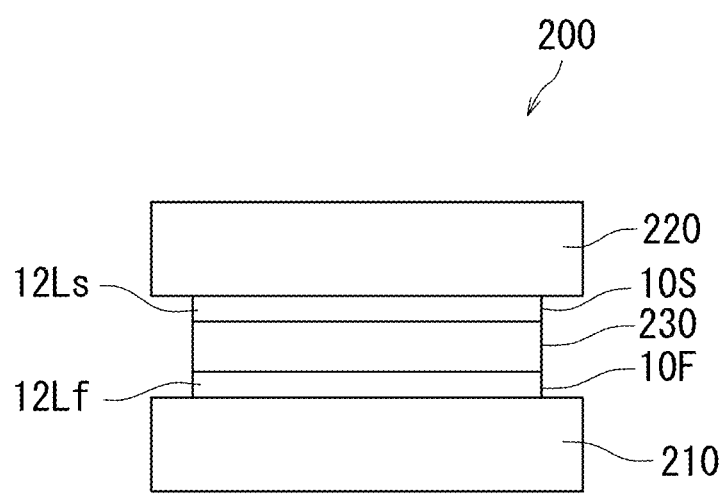
FIG. 10 is a schematic diagram of a bonding structure of the present embodiment.

The following describes a bonding structure 200 according to the present embodiment with reference to FIG. 10. FIG. 10 is a schematic diagram of the bonding structure 200 of the present embodiment.

The bonding structure 200 includes a bonding target 210, a bonding material 10F, a thermal stress absorber 230, a bonding material 10S, and a bonding target 220. In the bonding structure 200, the bonding target 210, the bonding material 10F, the thermal stress absorber 230, the bonding material 10S, and the bonding target 220 are layered in the stated order. Note that in the following description, the bonding target 210 may be referred to as a first bonding target 210 and the bonding target 220 may be referred to as a second bonding target 220. Also, the bonding material 10F may be referred to as a first bonding material 10F and the bonding material 10S may be referred to as a second bonding material 10S.

The first bonding material 10F includes a crystalline silver film 12Lf. The first bonding material 10F is bonded to the first bonding target 210 and the thermal stress absorber 230.

The second bonding material 10S includes a crystalline silver film 12Ls. The second bonding material 10S is bonded to the thermal stress absorber 230 and the second bonding target 220. In the bonding structure 200, the first bonding target 210 and the second bonding target 220 are bonded together with the first bonding material 10F, the thermal stress absorber 230, and the second bonding material 10S interposed between the first bonding target 210 and the second bonding target 220.

The first bonding target 210 and the second bonding target 220 may be any members. Examples of materials of the first bonding target 210 and the second bonding target 220 include those listed above as the examples of the materials of the first bonding target 110 and the bonding target 120. In an example, each or either of the bonding target 210 and the second bonding target 220 is a substrate. The substrate may be a metal substrate or an insulating substrate.

Preferably, a thermal expansion coefficient (linear expansion coefficient) of a material of the first bonding target 210 is smaller than the thermal expansion coefficient of silver. Similarly, a thermal expansion coefficient (linear expansion coefficient) of a material of the second bonding target 220 is preferably smaller than the thermal expansion coefficient of silver.

Particularly, a ratio of the thermal expansion coefficient of silver to each of the thermal expansion coefficients of the respective materials of the bonding targets 210 and 220 (thermal expansion coefficient of silver/thermal expansion coefficient of the material of the bonding target 210 or 220) is preferably at least 2.0. However, it is not essential that the thermal expansion coefficients of the respective materials of the bonding targets 210 and 220 are smaller than the thermal expansion coefficient of silver. The bonding targets 210 and 220 may be formed of materials having relatively high thermal expansion coefficients.

The bonding structure 200 of the present embodiment includes the thermal stress absorber 230. Therefore, heat shock during heating is reduced and the bonding structure 200 can be favorably produced through bonding. Examples of materials of the thermal stress absorber 230 are similar to the above-described examples of the materials of the bonding targets 210 and 220. The examples of materials of the thermal stress absorber 230 include molybdenum, tungsten, niobium, titanium, silicon, carbon, graphite, silicon carbide, silicon nitride, aluminum nitride, alumina, and Invar alloys.

Preferably, a thermal expansion coefficient (linear expansion coefficient) of a material of the thermal stress absorber 230 is lower than the thermal expansion coefficient (linear expansion coefficient) of silver. The thermal expansion coefficient of the material of the thermal stress absorber 230 is for example at least $0.1 \times 10^{-6}$ and smaller than $10.0 \times 10^{-6}$. Particularly, a ratio of the thermal expansion coefficient of silver to the thermal expansion coefficient of the material of the thermal stress absorber 230 (thermal expansion coefficient of silver/thermal expansion coefficient of the material of the thermal stress absorber 230) is preferably at least 2.0.

Also, at least a part of a surface of the thermal stress absorber 230 is preferably coated with a metal film. A thermal stress absorber 230 coated with a metal film facilitates favorable bonding. The surface of the thermal stress absorber 230 may be coated with silver, for example.

The bonding structure 200 of the present embodiment can be favorably produced through bonding using the bonding materials 10F and 10S including the crystalline silver films 12Lf and 12Ls. The first bonding target 210 and the second bonding target 220 can be favorably bonded in the present embodiment irrespective of the size of the first bonding target 210 and the size of the second bonding target 220.

The following describes a method for producing the bonding structure 200 of the present embodiment with reference to FIGS. 11A to 11E.

Figure 11A:
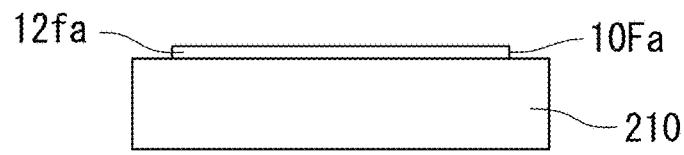

As illustrated in FIG. 11A, a bonding material 10Fa is formed on a surface of the first bonding target 210. The bonding material 10Fa includes an amorphous silver film 12fa. The bonding material 10Fa is produced for example as described above with reference to FIGS. 5A to 9B.

Figure 11B:
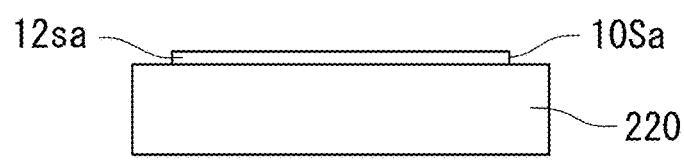

As illustrated in FIG. 11B, a bonding material 10Sa is formed on a surface of the second bonding target 220. The bonding material 10Sa includes an amorphous silver film 12sa. The bonding material 10Sa is produced for example as described above with reference to FIGS. 5A to 9B.

Figure 11C:
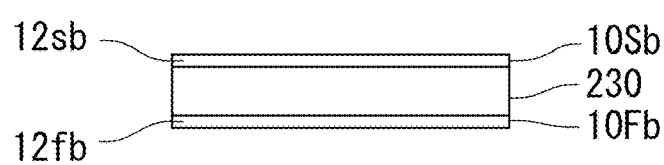

As illustrated in FIG. 11C, bonding materials 10Fb and 10Sb are formed on respective opposite surfaces of the thermal stress absorber 230. The bonding materials 10Fb and 10Sb respectively include amorphous silver films 12fb and 12sb. The bonding materials 10Fb and 10Sb are produced for example as described above with reference to FIGS. 5A to 9B.

Figure 11D:
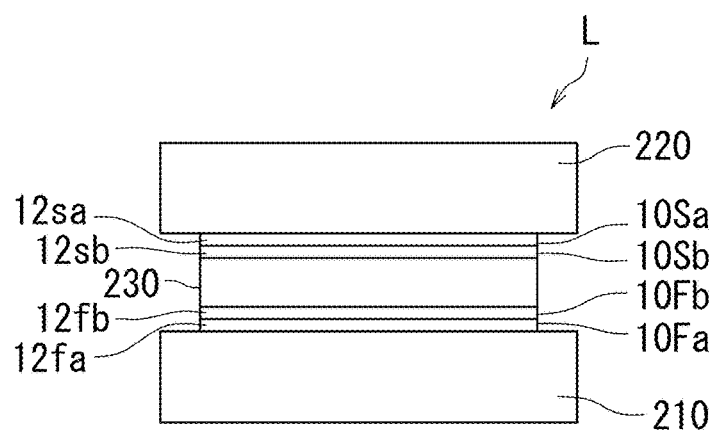

As illustrated in FIG. 11D, the thermal stress absorber 230 is layered on the first bonding target 210 such that the bonding material 10Fa on the first bonding target 210 is in contact with the bonding material 10Fb on the thermal stress absorber 230. Also, the second bonding target 220 is layered on the thermal stress absorber 230 such that the bonding material 10Sb on the thermal stress absorber 230 is in contact with the bonding material 10Sa on the second bonding target 220. A layered structure L is formed by arranging the first bonding target 210, the bonding materials 10Fa and 10Fb, the thermal stress absorber 230, the bonding materials 10Sb and 10Sa, and the second bonding target 220 in a layered manner as described above.

Figure 11E:
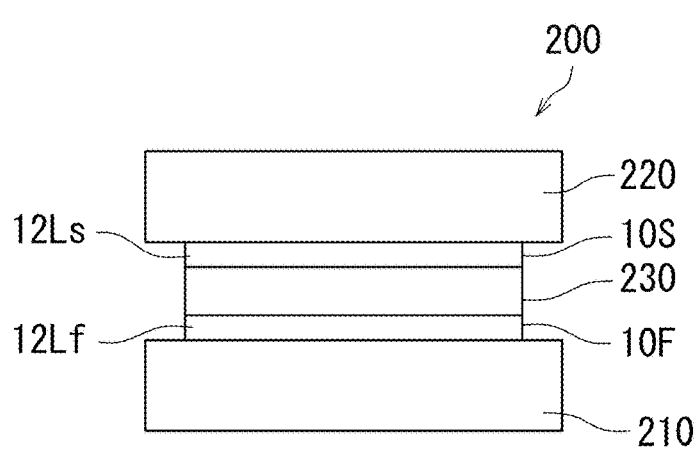

Next, the layered structure L is heated, whereby the bonding structure 200 is obtained as illustrated in FIG. 11E. Through heating of the layered structure L, the crystalline silver film 12Lf is formed from the amorphous silver films 12fa and 12fb included in the bonding materials 10Fa and 10Fb. Also, the crystalline silver film 12Ls is formed from the amorphous silver films 12sa and 12sb included in the bonding materials 10Sa and 10Sb.

When the layered structure L is heated, crystallization of the amorphous silver films 12fa and lab proceeds and an interface between the amorphous silver films 12fa and 12fb disappears. As a result, the crystalline silver film 12Lf is formed from the amorphous silver films 12fa and 12fb. When the amorphous silver films 12fa and 12fb included in the bonding materials 10Fa and 10Fb change to the crystalline silver film 12Lf, the bonding materials 10Fa and 10Fb are integrated to be the bonding material 10F. Note that an interface between two layers derived from the bonding materials 10Fa and 10Fb may be clearly identifiable in the bonding material 10F after heating. Alternatively, the interface may not be identifiable.

Similarly, when the layered structure L is heated, crystallization of the amorphous silver films 12sa and 12sb proceeds and an interface between the amorphous silver films 12sa and 12sb disappears. As a result, the crystalline silver film 12Ls is formed from the amorphous silver films 12sa and 12sb. When the amorphous silver films 12sa and 12sb included in the bonding materials 10Sa and 10Sb change to the crystalline silver film 12Ls, the bonding materials 10Sa and 10Sb are integrated to be the bonding material 10S. Note that an interface between two layers derived from the bonding materials 10Sa and 10Sb may be clearly identifiable in the bonding material 10S after heating. Alternatively, the interface may not be identifiable. Through the above, the bonding structure 200 is produced.

The layered structure L is heated through use of a heating plate or a heating furnace, or by rapid thermal annealing, for example. The layered structure L is heated at a heating temperature that is preferably at least 100° C. and no higher than 400° C., and more preferably at least 150° C. and no higher than 300° C. The layered structure L may be heated under an atmospheric pressure or in a vacuum. Alternatively, the layered structure L may be heated in an inert gas atmosphere or a reducing gas (for example, argon gas, nitrogen gas, hydrogen gas, or formic acid gas) atmosphere.

Similarly to the examples described above with reference to FIGS. 3A to 4D, an adhesive layer may be provided in the bonding structure 200 at interfaces between the first bonding target 210 and the amorphous silver film 12*fa*, between the amorphous silver film 12*fb* and the thermal stress absorber 230, between the thermal stress absorber 230 and the amorphous silver film 12*sb*, and/or between the amorphous silver film 12*sa* and the second bonding target 220. The presence of the adhesive layer strengthens bonding between the first bonding target 210 and the first bonding material 10F, bonding between the first bonding material 10F and the thermal stress absorber 230, bonding between the thermal stress absorber 230 and the second bonding material 10S, and/or bonding between the second bonding material 10S and the second bonding target 220. Examples of materials forming the adhesive layer include titanium and titanium nitride. The thickness of the adhesive layer is for example at least 0.01 μm and no greater than 0.05 μm.

Alternatively, similarly to the examples described above with reference to FIGS. 5A to 9B, a silver layer may be provided at interfaces between the first bonding target 210 and the amorphous silver film 12*fa*, between the amorphous silver film 12*fb* and the thermal stress absorber 230, between the thermal stress absorber 230 and the amorphous silver film 12*sb*, and/or between the amorphous silver film 12*sa* and the second bonding target 220.

The production method of the present embodiment uses the bonding materials 10Fa, 10Fb, 10Sa, and 10Sb including the amorphous silver films 12*fa*, 12*fb*, 12*sa*, and 12*sb*. Therefore, bonding can be performed through a relatively low pressure. For example, bonding can be performed without application of pressure or through a pressure of no greater than 1 MPa.

In a case where the bonding materials 10Fb and 10Sb are formed on the respective opposite surfaces of the thermal stress absorber 230 as described above with reference to FIG. 11C, the bonding materials 10Fb and 10Sb are preferably formed simultaneously on the respective opposite surfaces of the thermal stress absorber 230. This is because when the bonding materials 10Fb and 10Sb are formed in order in a case where the bonding materials 10Fb and 10Sb are formed by heating, bonding strength of a bonding material formed earlier may decrease.

In the example described above with reference to FIGS. 11A to 11E, the bonding material 10F is formed from the bonding materials 10Fa and 10Fb after formation of the bonding material 10Fa on the first bonding target 210 and formation of the bonding material 10Fb on the thermal stress absorber 230. However, the present invention is not limited to this configuration. It is possible to form only one of the bonding materials 10Fa and 10Fb and bond the first bonding target 210 and the thermal stress absorber 230 by the formed bonding material.

Similarly, in the example described above with reference to FIGS. 11A to 11E, the bonding material 10S is formed from the bonding materials 10Sa and 10Sb after formation of the bonding material 10Sa on the second bonding target 220 and formation of the bonding material 10Sb on the thermal stress absorber 230. However, the present invention is not limited to this configuration. It is possible to form only one of the bonding materials 10Sa and 10Sb and bond the thermal stress absorber 230 and the second bonding target 220 by the formed bonding material.

EXAMPLES

The following more specifically describes embodiments of the present invention using examples. Note that the present invention is by no means limited by the following examples.

(Sample 1)

A silver layer was formed on a silicon substrate by sputtering. Next, the silver layer was heated at 250° C. for 5 minutes to obtain Sample 1. A SEM photograph of Sample 1 was taken.

Figure 12:
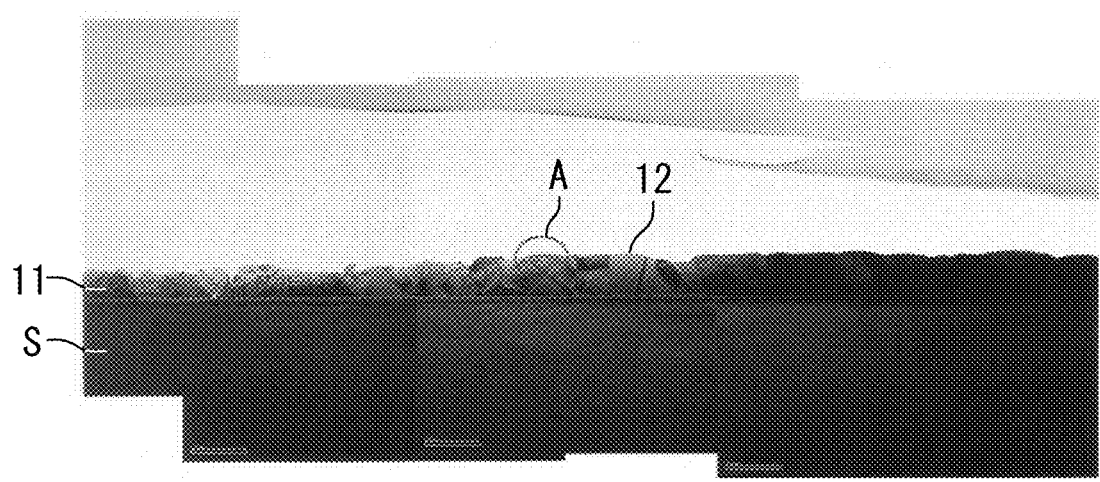
FIG. 12 is a schematic cross-sectional view of a sample in examples.
Figure 13:
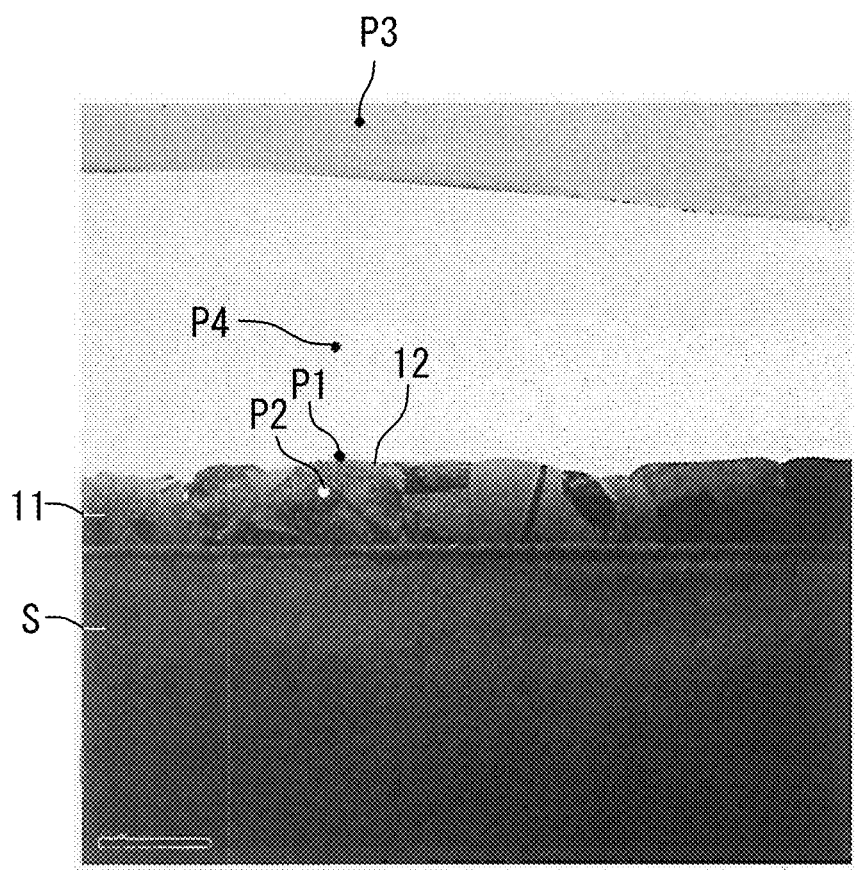
FIG. 13 is an enlarged view of a part of FIG. 12.

FIG. 12 is a diagram illustrating Sample 1. FIG. 13 is an enlarged view of a region A in FIG. 12. As shown in FIGS. 12 and 13, the amorphous silver film 12 was formed on the silver layer 11. Fluorescent X-ray analysis was performed on points P1 to P4 in FIG. 13 in a vacuum. In FIG. 13, the point P1 is located within the amorphous silver film 12, the point P2 is located within the silver layer 11, the point P3 is located within an adhesive material used for pasting Sample 1, and the point P4 is located within a vacuum area. In the fluorescent X-ray analysis, measurement was performed by setting a spot size to 25 nm and setting a live time to 100 seconds in a state where the beam was narrowed to be minimum.

FIGS. 14A to 14D are graph representations showing results of the fluorescent X-ray analysis on the points P1 to P4 in FIG. 13, respectively. A peak around 3.0 keV in FIG. 14B indicates presence of silver within the silver layer 11. Also, peaks around 2.0 keV to 2.5 keV in FIG. 14B indicate presence of silicon and molybdenum as impurities within the silver layer 11.

A peak around 3.0 keV in FIG. 14A indicates presence of silver within the amorphous silver film 12. Also, peaks around 2.0 keV to 2.5 keV in FIG. 14A indicate presence of silicon and molybdenum as impurities within the amorphous silver film 12 too. The above results show that components of the amorphous silver film 12 were derived from the silver layer, Note that the spectrum shown in FIG. 14C indicates that silicon was present as an impurity in the adhesive material, but silver was not present in the adhesive material. Similarly, the spectrum shown in FIG. 14D indicates that silicon was present as an impurity in the vacuum, but silver was not present in the vacuum.

Figure 15A:
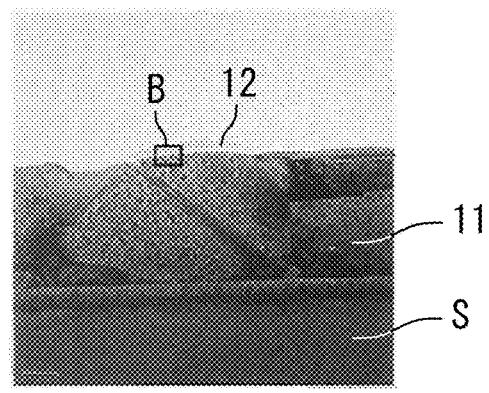
FIG. 15A is an enlarged view of a part of FIG. 13.
Figure 15B:
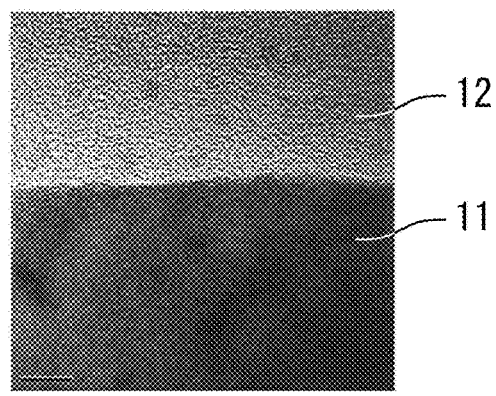
FIG. 15B is an enlarged view of a part of FIG. 15A.
Figure 15C:
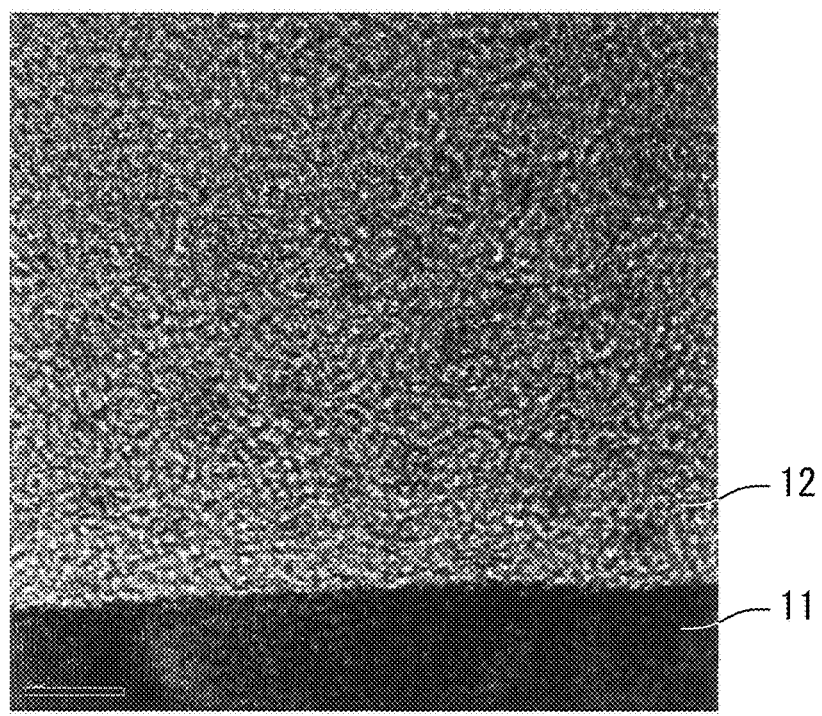
FIG. 15C is an enlarged view of a part of FIG. 15B.

FIG. 15A is an enlarged view of a part of FIG. 13. FIG. 15B is an enlarged view of a region B in FIG. 15A. FIG. 15C is an enlarged view of a part of FIG. 15B. The thickness of the silver layer 11 was approximately 300 nm and the thickness of the amorphous silver film 12 was approximately 30 nm.

A number of black spots were observed within the amorphous silver film 12 in FIGS. 15B and 15C. These black spots are thought to be seed crystals.

As described above, it was confirmed through analysis of Sample 1 that the amorphous silver film 12 was formed on the silver layer 11.

(Sample 2)

A silicon substrate in the form of a thin plate was provided. The outside longitudinal dimension and the outside transverse dimension of the silicon substrate were both approximately 8 mm. Next, a silver layer was formed on the silicon film. The outside longitudinal dimension and the outside transverse dimension of the silver layer were both approximately 7 mm.

Further, a copper plate was provided. The outside longitudinal dimension and the outside transverse dimension of the copper plate were both approximately 7 mm. Openings were formed in the copper plate in the form of two rows of character strings about the center of the copper plate to obtain a copper mask. The character string of the first row formed in the copper mask was "ISIR" and the character string of the second row formed in the copper mask was "NCKU". Each character had a longitudinal dimension of approximately 600 μm and a transverse dimension of approximately 300 μm.

Next, the copper mask was disposed apart from the silver layer to be opposed to the silver layer. The silver layer was heated at 250° C. for 5 minutes in the air to obtain Sample 2. Next, an optical microscope photograph of Sample 2 was taken.

Figure 16A:
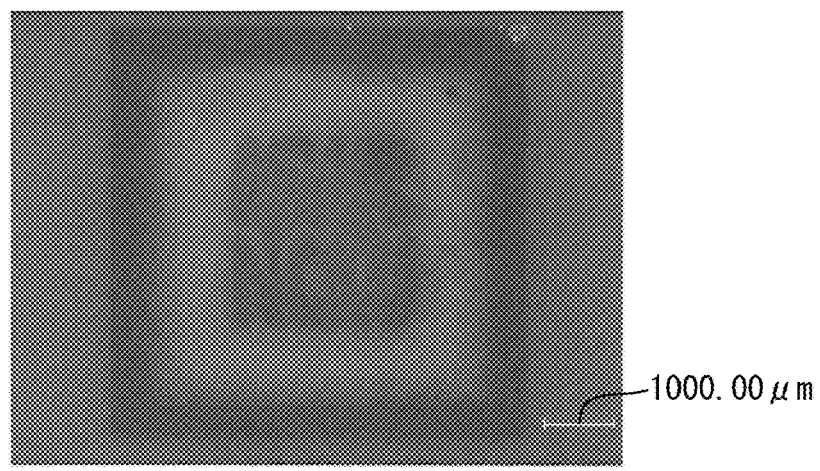
FIGS. 16A to 16C are diagrams illustrating a sample in the examples.
Figure 16B:
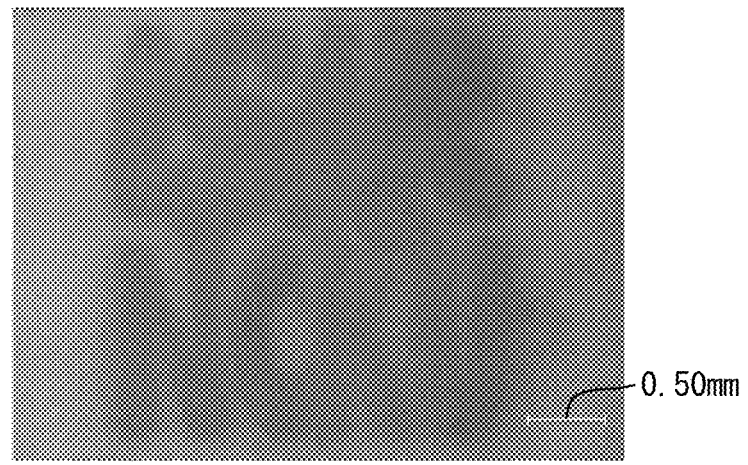
Figure 16C:
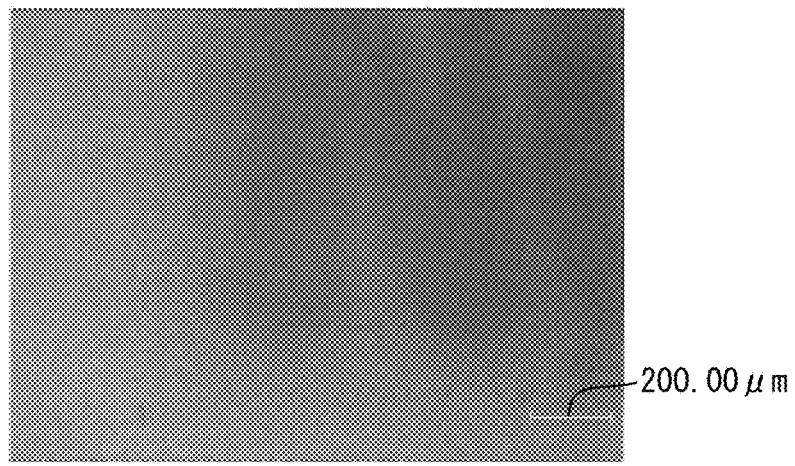

FIG. 16A is a diagram illustrating Sample 2. FIG. 16B is an enlarged view of a part of FIG. 16A. FIG. 16C is an enlarged view of a part of FIG. 16B.

In FIGS. 16A to 16C, bright areas (white areas) indicate presence of an amorphous silver film, and dark areas (black areas) indicate absence of the amorphous silver film. FIGS. 16A to 16C indicate that the amorphous silver film was formed in areas corresponding to the copper plate of the copper mask, and the amorphous silver film was not formed in areas corresponding to the openings in the copper mask.

It is thought that in the air, gasified silver spouted out from the silver layer, collided with the plate, and then returned to the silver layer below under the atmospheric pressure to be deposited on the silver layer. By contrast, it is thought that in the air, a portion of the gasified silver spouted out from the silver layer and did not collide with the plate traveled without returning to the silver layer As described above, it was confirmed through analysis of Sample 2 that silver weakly spouted out from the silver layer when the silver layer was heated in the air.

(Sample 3)

A silicon substrate in the form of a thin plate was provided. The outside longitudinal dimension and the outside transverse dimension of the silicon substrate were both approximately 8 mm. Next, a silver layer was formed on the silicon film. The outside longitudinal dimension and the outside transverse dimension of the silver layer were both approximately 7 mm.

Also, a copper plate was provided. Openings were formed in the copper plate in the form of a row of a character string about the center of the copper plate to obtain a copper mask. The character string formed in the copper mask was "NCKU". Each character had a longitudinal dimension of approximately 600 μm and a transverse dimension of approximately 300 μm.

Next, the copper mask was disposed apart from the silver layer to be opposed to the silver layer. The silver layer was heated at 250° C. for 5 minutes in a vacuum to obtain Sample 3. Next, an optical microscope photograph of Sample 3 was taken.

Figure 17A:
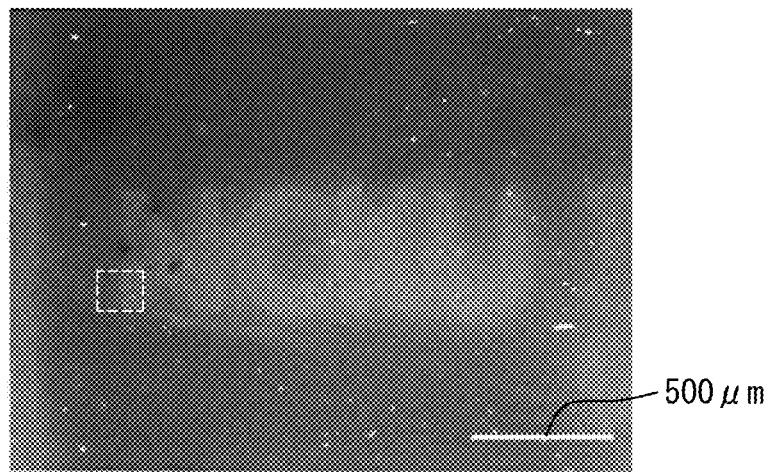
FIGS. 17A and 17B are diagrams illustrating a sample in the examples.
Figure 17B:
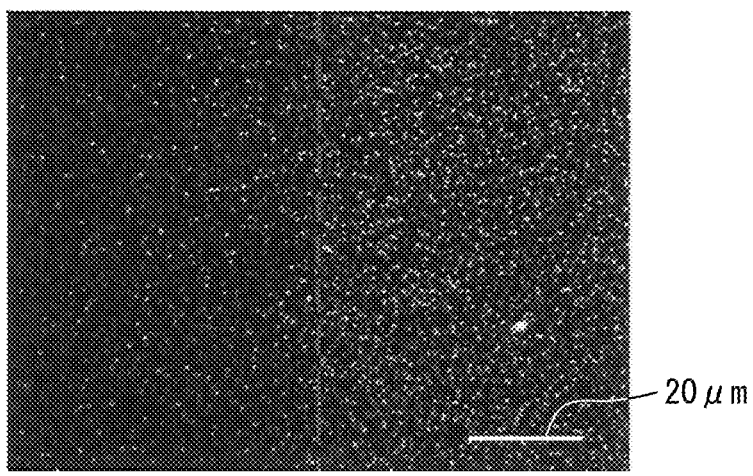

FIG. 17A is a diagram illustrating Sample 3. FIG. 17B is an enlarged view of a surrounded region in FIG. 17A.

In FIGS. 17A and 17B, bright areas (white areas) indicate presence of an amorphous silver film, and dark areas (black areas) indicate absence of the amorphous silver film. FIGS. 17A and 17B indicate that the amorphous silver film was not formed in areas corresponding to the copper plate of the copper mask, and the amorphous silver film was formed in areas corresponding to the openings in the copper mask.

It is thought that in the vacuum, gasified silver spouted out from the silver layer, collided with the plate, then scattered and traveled without returning to the silver layer. By contrast, it is thought that in the vacuum, a portion of the gasified silver spouted out from the silver layer and collided with peripheries of the openings in the copper mask returned to the silver layer below to be deposited on the silver layer, As described above, it was confirmed through analysis of Sample 3 that silver strongly spouted out from the silver layer when the silver layer was heated in the vacuum.

Through the above, the embodiments and the examples of the present invention have been described with reference to the drawings. However, the present invention is not limited to the above embodiments and examples, and can be practiced in various manners within a scope not departing from the gist of the present invention. The drawings schematically illustrate elements of configuration as necessary to facilitate understanding thereof. Properties such as thickness and length, and the number of the elements of configuration illustrated in the drawings may differ from actual ones thereof in order to facilitate preparation of the drawings. Also, shape, dimensions, and the like of elements of configuration described in the above embodiments and examples are merely examples and should not be taken as specific limitations. It goes without saying that various alterations can be made.

INDUSTRIAL APPLICABILITY

The bonding material according to the present invention is suitably used for bonding a plurality of members together.

REFERENCE SIGNS LIST

10 Bonding material
11 Silver layer
12 Amorphous silver film
100 Bonding structure
110 Bonding target
120 Bonding target
200 Bonding structure
210 Bonding target
220 Bonding target

The invention claimed is:

1. A bonding material comprising:
an amorphous silver film, and
a silver layer in contact with the amorphous silver film.
2. The bonding material according to claim 1, wherein
the silver layer has any of a micro-crystal structure, a columnar crystal structure, an equiaxed crystal structure, and a mixed grain structure.
3. The bonding material according to claim 1, wherein
the silver layer has a thickness of at least 10 nm and no greater than 1 mm.
4. A method for producing a bonding material, comprising:
providing a silver layer; and forming an amorphous silver film from the silver layer by heating the silver layer, wherein in the forming an amorphous silver film, the amorphous silver film is formed on the silver layer.

5. The method for producing a bonding material according to claim 4, wherein the providing a silver layer includes forming the silver layer on a support member by any of sputtering, plating, chemical vapor deposition, and evaporation.

6. The method for producing a bonding material according to claim 4, wherein in the providing a silver layer, the silver layer has any of a micro-crystal structure, a columnar crystal structure, an equiaxed crystal structure, and a mixed grain structure.

7. The method for producing a bonding material according to claim 4, wherein the forming an amorphous silver film includes:

disposing a counter member to be opposed to the silver layer; and in a state where the counter member is disposed, heating the silver layer to form the amorphous silver film on the counter member.

8. A method for producing a bonding structure, comprising:

providing a first bonding target and a second bonding target;

forming a bonding material on a surface of at least one bonding target among the first bonding target and the second bonding target;

forming a layered structure by arranging the first bonding target, the bonding material, and the second bonding target in a layered manner by disposing the bonding material between the first bonding target and the second bonding target; and bonding the first bonding target and the second bonding target via the bonding material by heating the layered structure, wherein the forming a bonding material includes:

providing a silver layer; and forming an amorphous silver film from the silver layer by heating the silver layer such that the amorphous silver film is formed on the silver layer.

9. The method for producing a bonding structure according to claim 8, wherein in the forming an amorphous silver film, the amorphous silver film is formed before the layered structure is heated.

10. The method for producing a bonding structure according to claim 8, wherein the providing a silver layer includes forming the silver layer on the surface of the at least one bonding target, and in the forming an amorphous silver film, the amorphous silver film is formed on the silver layer.

11. The method for producing a bonding structure according to claim 8, wherein the providing a silver layer includes forming the silver layer on a surface of a member other than the at least one bonding target, and the forming an amorphous silver film includes forming the amorphous silver film from the silver layer on the surface of the at least one bonding target.

12. The bonding material according to claim 1, wherein the silver layer is not in an amorphous state.

13. The bonding material according to claim 1, wherein the amorphous silver film has a thickness of at least 10 nm and no greater than 1 μm.

14. The bonding material according to claim 1, wherein the amorphous silver film is thinner than the silver layer.

* * * * *